(12) United States Patent
Haddadin

(10) Patent No.: US 10,710,243 B2
(45) Date of Patent: Jul. 14, 2020

(54) CONTROL AND REGULATION OF ACTUATORS OF A ROBOT BY TAKING INTO CONSIDERATION AMBIENT CONTACTS

(71) Applicant: Cavos Bagatelle Verwaltungs GmbH & Co. KG, München (DE)

(72) Inventor: Sami Haddadin, Hannover (DE)

(73) Assignee: Cavos Bagatelle Verwaltungs GmbH & Co. KG, München (DE)

( * ) Notice: Subject to any disclaimer, the term of this patent is extended or adjusted under 35 U.S.C. 154(b) by 306 days.

(21) Appl. No.: 15/575,490

(22) PCT Filed: May 10, 2016

(86) PCT No.: PCT/EP2016/060419
§ 371 (c)(1),
(2) Date: Nov. 20, 2017

(87) PCT Pub. No.: WO2016/184726
PCT Pub. Date: Nov. 24, 2016

(65) Prior Publication Data
US 2018/0161981 A1 Jun. 14, 2018

(30) Foreign Application Priority Data

May 20, 2015 (DE) .......... 10 2015 108 010

(51) Int. Cl.
*G05B 19/18* (2006.01)
*B25J 9/16* (2006.01)

(52) U.S. Cl.
CPC .......... *B25J 9/1676* (2013.01); *B25J 9/1628* (2013.01); *G05B 2219/40201* (2013.01);
(Continued)

(58) Field of Classification Search
CPC ........ B25J 9/1676; B25J 9/1628; B25J 19/02; B25J 19/063; Y10S 901/15; Y10S 901/46;
(Continued)

(56) References Cited

U.S. PATENT DOCUMENTS

2009/0105878 A1* 4/2009 Nagasaka .............. B25J 13/084
700/245
2013/0073084 A1* 3/2013 Ooga ..................... B25J 9/1633
700/254
(Continued)

FOREIGN PATENT DOCUMENTS

DE 10226853 B3 2/2004
DE 102007028390 A1 12/2008
(Continued)

OTHER PUBLICATIONS

Liebschner, Mario; German Examination Report; 4 pages; DE 10 2015 108 010.9; dated Oct. 5, 2015.
(Continued)

*Primary Examiner* — Khoi H Tran
*Assistant Examiner* — B M M Hannan
(74) *Attorney, Agent, or Firm* — Nexsen Pruet, LLC; Todd A. Serbin

(57) ABSTRACT

A method and device for the control and regulation of actuators of a robot, taking environmental contacts into consideration, wherein the robot comprises at least two parts, which are connected by an articulated joint drivable by an actuator. The method comprises: by way of a sensor system, ascertaining and storing a time-dependent variable, as a function of the time, of one or more external contact forces and/or of one or more external moments on the parts, providing a condition for the variable, classifying the feature vector based on predefined categories, which each indicate
(Continued)

a contact type between one of the parts or the articulated joint and an object in a surrounding environment, which are each imparted by corresponding external contact forces and/or external contact moments, to generate a classification result, and open-loop and/or closed-loop control of the actuator as a function of the classification result.

18 Claims, 2 Drawing Sheets

(52) U.S. Cl.
CPC ... *G05B 2219/40202* (2013.01); *Y10S 901/09* (2013.01); *Y10S 901/15* (2013.01); *Y10S 901/46* (2013.01)

(58) Field of Classification Search
CPC ........ Y10S 901/09; G05B 2219/40202; G05B 2219/40201
USPC .................................. 700/253–255, 260–262
See application file for complete search history.

(56) References Cited

U.S. PATENT DOCUMENTS

| | | |
|---|---|---|
| 2013/0073085 A1 | 3/2013 | Oaki et al. |
| 2013/0112010 A1* | 5/2013 | Matsumoto ............ B25J 19/028 73/862.044 |
| 2013/0131865 A1* | 5/2013 | Yamane ................. B25J 9/1692 700/254 |
| 2014/0121837 A1* | 5/2014 | Hashiguchi ............ B25J 9/0087 700/261 |
| 2016/0236349 A1* | 8/2016 | Yamane ................. B25J 9/1664 |
| 2017/0021504 A1* | 1/2017 | Matsuzawa ............ B25J 9/1694 |
| 2017/0232613 A1* | 8/2017 | Ponulak .................. B25J 9/163 700/253 |

FOREIGN PATENT DOCUMENTS

| | | |
|---|---|---|
| DE | 10 2010 063 208 A1 | 6/2012 |
| DE | 102010063208 A1 | 6/2012 |
| DE | 10 2013 110 901 A1 | 4/2015 |
| DE | 10 2013 212 887 A1 | 4/2015 |
| DE | 102013110901 A1 | 4/2015 |
| DE | 102013212887 A1 | 4/2015 |
| EP | 2364243 B1 | 8/2012 |

OTHER PUBLICATIONS

Chabot, Pedro; International Search Report; 4 pages; PCT/EP2016/060419; dated Jun. 30, 2016.

* cited by examiner

CONTROL AND REGULATION OF ACTUATORS OF A ROBOT BY TAKING INTO CONSIDERATION AMBIENT CONTACTS

RELATED APPLICATIONS

This application is a U.S. national phase application, claiming priority under 35 U.S.C. 371 to PCT application PCT/EP2016/060419, filed on May 10, 2016, claiming priority to German national application 10 2015 108 010.9, filed on May 20, 2015, the contents of the these applications incorporated by reference as if fully set forth herein in their entirety.

FIELD AND BACKGROUND OF THE INVENTION

The invention relates to a method and to a device for the control and regulation of actuators of a robot.

Previous attempts to solve problems in the field include US2013/073085, DE102013110901, DE102013212887, DE102010063208, DE102007028390, EP2364243 and DE10226853.

DESCRIPTION OF EMBODIMENTS OF THE INVENTION

Figure 1:
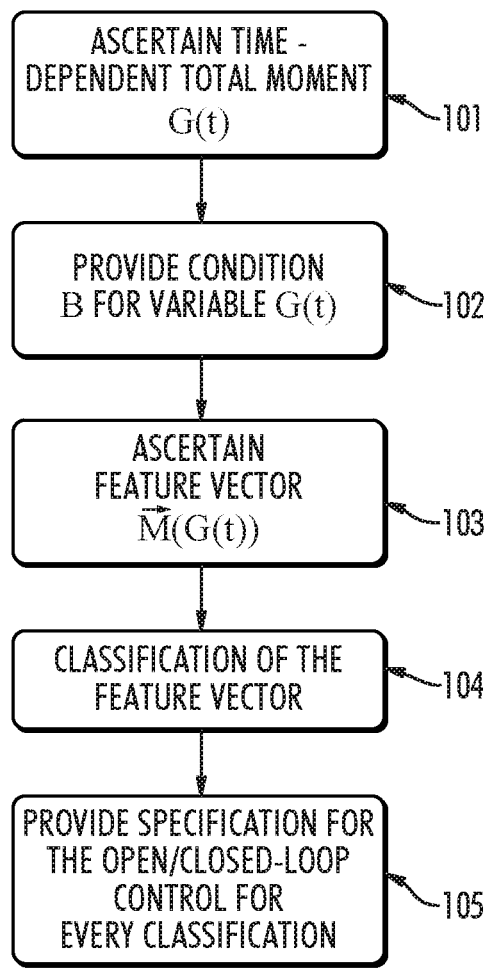
FIG. 1 shows a flow chart of a method according to the invention.

The detection and interpretation of mechanical environmental contacts is important for the open-loop and closed-loop control of parts of the robot movable by way of actuators (such as the links of a robotic arm), and in particular during robot-human interactions and collaboration. The key here is to distinguish between desirable contact events and undesirable contact events, which is to say collisions. Desirable contact events typically result from the task of the robot, such as handling an object and/or robot-human interactions in a predefined interaction range. Undesirable contact events are all contact events that are not desirable contact events. These are, in particular, collisions with objects or people in the surrounding environment of the robot, which are not located within the predefined interaction range, or also with the surrounding environment itself.

It is the object of the invention to provide an improved method and an improved device for the open-loop and closed-loop control of actuators of a robot, taking environmental/ambient contacts into consideration.

The invention is derived from the features of the independent claims. Advantageous refinements and embodiments are the subject matter of the dependent claims. Additional features, application options and advantages of the invention are derived from the following description, as well as the description of exemplary embodiments of the invention, which are illustrated in the drawings.

The aspect of the object in terms of the method is achieved by a method for the open-loop and closed-loop control of actuators of a robot, taking environmental contacts into consideration, wherein the robot comprises at least two parts, which are connected by way of an articulated joint drivable by an actuator. The parts may be links of a robotic arm, or the head, trunk or extremities of a humanoid. In particular, the robot can comprise multiple parts, which are connected by way of multiple articulated joints drivable by an actuator.

The method comprises the following steps. In a first step, a sensor system is used to ascertain and store a one-dimensional or multidimensional time-dependent variable $G(t)$, which can be used to describe the action, as a function of the time, of one or more external contact forces $F_{ext}$ and/or of one or more external moments $M_{ext}$ on the parts. The variable $G(t)$ may, in particular, be multidimensional, which is to say comprise multiple components $g(t)$. $G(t)=[g_1(t), g_2(t), g_3(t), g_4(t),$ and so forth]. The variable $G(t)$ may, for example, indicate one or more forces and/or one or more torques and/or one or more mechanical stresses and/or one or more pressures, or may indicate one or more one-dimensional or multidimensional variables ascertained therefrom. Components of the variable $G(t)$ may relate to a jth articulated joint or a jth of the parts: $G_j(t)$, which is to say components of the variable $G(t)$, are each ascertained for several of the parts and/or for several of the articulated joints.

The sensor system advantageously comprises measuring sensors for detecting forces, moments, stresses and/or pressures, furthermore an evaluation electronics unit and a memory unit for at least temporarily storing measurement results. The sensor system advantageously comprises proximity sensors, which is to say sensors that detect when an object approaches, without mechanical contact already existing. The sensor system advantageously comprises at least one sensor which is arranged on one of the parts and comprises sensor elements arranged in a planar manner for the position-sensitive detection of external forces $F_{ext}$ and/or moments $M_{ext}$ relative to the part, wherein the variable $G(t)$ is ascertained based on the detected external forces $F_{ext}$ and/or moments $M_{ext}$. One example of this refinement is the use of an "artificial skin" comprising haptic sensors for detecting forces, moments, stresses, pressures, action sites and the like acting on the parts. The sensor system may, in particular, include a torque sensor and/or force sensor and/or acceleration sensor connected to one of the articulated joints for detecting a torque engaging on the articulated joint and/or a force engaging on the articulated joint and/or an acceleration engaging on the articulated joint.

Advantageously, the sensor system comprises a unit for estimating or predicting forces, moments, stresses and/or pressures based on current measurement data of the measuring sensors. Advantageously, historical measurement data of collisions with objects are used in the estimation/prediction.

In a second step, a condition B for this variable $G(t)$ is provided. The condition B may be time-variant and/or dependent on the state of the robot. A simple condition B, for example, reads: the absolute value of $G(t)$: $|G(t)|$ is smaller than or equal to a limiting value F: $|G(t)| \leq F$. A possible 1-dimensional formulation reads, for example: $|g_i(t)| \leq f_i$ where $G(t)=[g_i(t)]$; $F=[f_i]$ and $i=1, 2, \ldots, 1$. The condition B is advantageously selected in such a way that a distinction is possible between an action and a non-action of an external force $F_{ext}$ and/or moment $M_{ext}$ on the moving parts of the robot, wherein in the present case it is assumed that no action of an external force $F_{ext}$ and/or moment $M_{ext}$ exists as long as the condition B is satisfied.

The condition is advantageously selected so as to allow a distinction between an operation of the robot without the action of an external force or of an external moment and an operation of the robot with the action of an external force or an external moment.

The condition B may advantageously be ascertained, for example, in that the robot, with its parts movable by way of actuators, carries out random movements without the influence of external forces $F_{ext}$ (the gravitational force and possibly the Coriolis force shall be excluded), and parameters describing these movements (such as forces, moments, pulses and the like) are detected and evaluated by way of the sensor system. This range of parameters thus defines movements of the robot without the action of an external force $F_{ext}$.

In a third step, provided that the condition B is not satisfied by G(t) at a time $t_0$, a feature vector $\vec{M}$ is ascertained for the detected variable G(t) over a time interval $T=[t_a; t_e]$; where $t_a$=start of the time interval, $t_e$=end of the time interval, $t_0 \in T$ and $t_0 < t_e$, the feature vector comprising all the following components:
  a median or mean value of G(t) in the time interval T;
  a minimum and a maximum of G(t) in the time interval T;
  a deviation of G(t) from the median or from the mean value in the time interval T;
  a signal width of G(t) in the time interval T;
  a frequency spectrum of G(t) in the time interval T; and
  one or more characteristic frequencies of the frequency spectrum.

Following the above logic, $t_0$ indicates the point in time at which the predefined condition B is no longer satisfied by G(t), which is to say starting at which point in time at least one external force $F_{ext}$ or a moment acts on at least one of the parts or an articulated joint. Advantageously, the start $t_a$ of the time interval T and the end $t_e$ of the time interval T are time-dependent: $t_a=t_a(t)$ and $t_e=t_e(t)$, or only the end $t_e$ of the time interval T is time-dependent: $t_e=t_e(t)$. In the first case, for example, the interval T may chronologically shift with the time t. In the second case, the time interval T is greater to one side, which is to say the point in time $t_a$ is fixed and only $t_e(t)$ shifts with the time t. The time interval T advantageously has a duration of 10 ms, 20 ms, 50 ms, 75 ms, 100 ms, 250 ms, 500 ms, 750 ms, 1 s, 1.5 s, 2.0 s, 2.5 s, 3.0 s, 4.0 s, 5.0 s, 6.0 s, 7.0 s or 10 s.

In a fourth step, the ascertained feature vector $\vec{M}$ is classified based on predefined categories, which each indicate a contact type between at least one of the parts or one of the articulated joints and an object, which are each imparted by corresponding external contact forces $F_{ext}$ and/or external contact moments $M_{ext}$, to generate a classification result KE. In addition to a distinction between "desirable contact event" and "undesirable contact event," the categories advantageously also allow information to be provided about the type of the object triggering the contact, for example whether the contact site of the contact object is made of a hard or a less hard material. The categories can be easily ascertained by conducting appropriate test series and/or simulation calculations or from provided databases, for example from a data "cloud."

The classification of the feature vector $\vec{M}$ advantageously takes place by way of a support vector machine (SVM) and/or by way of a hidden Markov model and/or by way of a neural network and/or by way of a Gaussian process, or a combination thereof.

In a fifth step, the open-loop and/or closed-loop control of the at least one actuator for times $t > t_0$ take place as a function of the classification result KE. Depending on the ascertained classification result KE, open-loop and/or closed-loop control of the actuator advantageously takes place in such a way that a movement of the parts is stopped, slowed, accelerated, or a movement in the opposite direction is initiated. An accelerated movement and a movement in the opposite direction correspond to an evasive movement so as to mitigate potential damage to the robot or to the collision object.

The inventors recognized that the proposed method, and in particular the proposed compilation of the components of the feature vector $\vec{M}$, allow a very precise and robust analysis and classification of the manner of action of an external force $F_{ext}$ as a desirable contact event or an undesirable contact event, so that the method makes the open-loop and/or closed-loop control of actuators of the robot possible with significantly improved consideration of environmental contacts, and in response thereto.

The analysis and classification of environmental contacts of the robot may advantageously be improved when the feature vector $\vec{M}$ additionally comprises the following components:
  a degree of the informational content, such as Shannon entropy or Shannon entropy distribution of G(t) in the time interval T; and/or
  one or more Hjorth parameters, such as the activity, mobility or complexity of G(t) in the time interval T; and/or
  one or more energy-related parameters of G(t) in the time interval T; and/or
  one or more autocorrelation-related parameters of G(t) in the time interval T; and/or
  one or more skewness parameters of G(t) in the time interval T; and/or
  one or more spectral phase parameters of G(t) in the time interval T; and/or
  one or more spectral amplitude parameters of G(t) in the time interval T.

Furthermore advantageously, the feature vector $\vec{M}$ can comprise parameters of two or more classifiers that are chronologically staggered with respect to one another, wherein the classifiers are also able to ascertain the parameters for different time intervals T.

The object of the invention is moreover achieved by a computer system comprising a data processing device, wherein the data processing device is designed in such a way that a method, as described above, is carried out on the data processing device.

Moreover, the object of the invention is achieved by a digital storage medium having electronically readable control signals, wherein the control signals can cooperate with a programmable computer system in such a way that a method, as described above, is carried out.

The object of the invention is furthermore achieved by a computer program product including program code stored on a machine-readable carrier for carrying out the method, as described above, when the program code is executed on a data processing device.

Finally, the invention relates to a computer program including program code for carrying out the method, as described above, when the program is executed on a data processing device. For this purpose, the data processing device can be designed as any arbitrary computer system known from the related art.

The aspect of the invention in terms of the device is achieved by a device for the open-loop and closed-loop control of actuators of a robot, taking environmental contacts into consideration, wherein the robot comprises at least two parts, which are connected by way of an articulated joint drivable by an actuator, comprising: a sensor system for ascertaining and storing a time-dependent variable $G(t)$, which can be used to describe the action, as a function of the time, of one or more external contact forces $F_{ext}$ and/or of one or more external moments $M_{ext}$ on the parts, an interface for providing a condition B for this variable $G(t)$, an evaluation unit, which is configured and designed in such a way that, provided that the condition B is not satisfied by $G(t)$ at a time $t_0$, a feature vector $\vec{M}$ is ascertained for the detected variable $G(t)$ over a time interval $T=[t_a, t_e]$, where $t_a$=start of the time interval, $t_e$=end of the time interval, $t_0 \in T$ and $t_0 < t_e$, the feature vector comprising the following components: a median or mean value of $G(t)$ in the time interval T, a minimum and a maximum of $G(t)$ in the time interval T, a deviation of $G(t)$ from the median or from the mean value in the time interval T, a signal width of $G(t)$ in the time interval T, a frequency spectrum of $G(t)$ in the time interval T, and one or more characteristic frequencies of the frequency spectrum, a classification unit for classifying the feature vector $\vec{M}$ based on predefined categories of possible feature vectors $\vec{M}_m$, which each indicate a contact type between the parts and an object in a surrounding environment, which are each imparted by corresponding external contact forces $F_{ext}$ and/or external contact moments $M_{ext}$, to generate a classification result KE, and a unit for the open-loop and closed-loop control of the actuator as a function of the classification result KE.

Sensors of the sensor system can advantageously be a combination of proximity sensors and force sensors, wherein force sensors are not necessarily able to distinguish between push and pull (whether a force is pulling or pushing results from the information as to the side of the body on which the force acts); in this case, for example, the proximity sensors could resolve this ambiguity.

Refinements and advantages of the proposed device are derived from a corresponding and analogous application of the comments provided for the proposed method.

Additional advantages, characteristics and details will be apparent from the description, which in detail describes at least one exemplary embodiment—where necessary, with reference to the drawing. Identical parts, similar parts and/or parts with equivalent functions have been denoted by the same reference numerals.

FIG. 1 shows a flow chart of a method according to the invention for the open-loop and closed-loop control of three actuators of a robotic arm, taking environmental contacts into consideration, wherein the robotic arm in the present exemplary embodiment comprises four am segments, which are connected in series by way of three articulated joints, each of which is drivable by one of the actuators. In the present exemplary embodiment, each of the three articulated joints moreover comprises a moment sensor for detecting moment measurement values $m_i(t)$, where i—1, 2, 3. Over the course of time, each moment sensor thus detects a time series of measurement values $m_i(t)$.

In addition to the moment sensors, a sensor system comprises an evaluation unit and a memory unit. In a first step 101, the sensor system, based on the moment measurement values $m_i(t)$, in the present example ascertains a time-dependent total moment $G(t)$ acting on the robotic arm. The moment measurement values $m_i(t)$ generally do not yet directly yield the external total moment $G(t)$ since inertial forces, Coriolis forces and gravitational forces still have to be considered. For this purpose, the external total moment $G(t)$ generally first has to be estimated or at least (if acceleration sensors are present) algebraically ascertained.

The variable $G(t)$ is accordingly a scalar variable in the exemplary embodiment, which can be used to describe the action, as a function of the time, of one or more external contact forces Fee and/or of one or more external moments $M_{ext}$ on the robotic arm. Naturally, the variable $G(t)$ can also be multidimensional. In a simple multidimensional case, for example, $G(t)=G_i(t)=[g_1(t), g_2(t), g_3(t)]^T=m_i(t)=[m_1(t), m_2(t), m_3(t)]^T$.

In a second step 102, a condition B for the variable $G(t)$ is provided, which in the present case is the condition $G(t) \leq F$. The condition B or the limiting value $F_i$ is selected such that the condition B is satisfied as long as no environmental contact with the robotic arm takes place, which is to say neither a desirable nor an undesirable contact event is present. The corresponding limiting value F may be ascertained in test series for this purpose, in which the robotic arm carries out random movements, without any environmental contact occurring. The closed-loop control of the actuators involves calibration steps which seek to improve the measurement or estimation of the external torques and/or external forces.

Provided that the condition B is not satisfied by $G(t)$ at a time $t_0$, which is to say environmental contact occurred, in a third step 103 a feature vector $\vec{M}$ ($G(t)$) is ascertained for the detected variable $G(t)$ over a time interval $T=[t_a, t_e]$, where $t_a$=start of the time interval, $t_e$=end of the time interval, $t_0 \in T$ and $t_0 < t_e$, the feature vector comprising all the following components:

a median of $G_i(t)$ in the time interval T;
a minimum and a maximum of $G(t)$ in the time interval T;
a deviation of $G(t)$ from the median in the time interval T;
a signal width of $G(t)$ in the time interval T;
a frequency spectrum of $G(t)$ in the time interval T; and
natural frequencies of the frequency spectrum.

In a fourth step 104, a classification of the feature vector $\vec{M}$ ($G(t)$) takes place based on predefined categories of possible feature vectors $\vec{M}_m$ to generate a classification result KE. The classification result KE thus indicates a specific contact category. The predefined categories of possible feature vectors $\vec{M}_m$ are ascertained based on corresponding test series, for example, in which a wide variety of scenarios of environmental contacts are evaluated and divided into categories. These categories advantageously indicate different types of contact between one of the arm segments and/or the articulated joints and an object of a surrounding environment, which are imparted by external forces $F_{ext}$ and/or by contact moments $M_{ext}$.

In a fifth step 105, the open-loop and/or closed-loop control of the actuators for times $t > t_0$ take place as a function of the classification result KE. For this purpose, a specification for the open-loop and/or closed-loop control is provided for every classification result, such as in a look-up table. However, a relationship may also be achieved via mathematical formulas, such as by way of differential equations.

Figure 2:
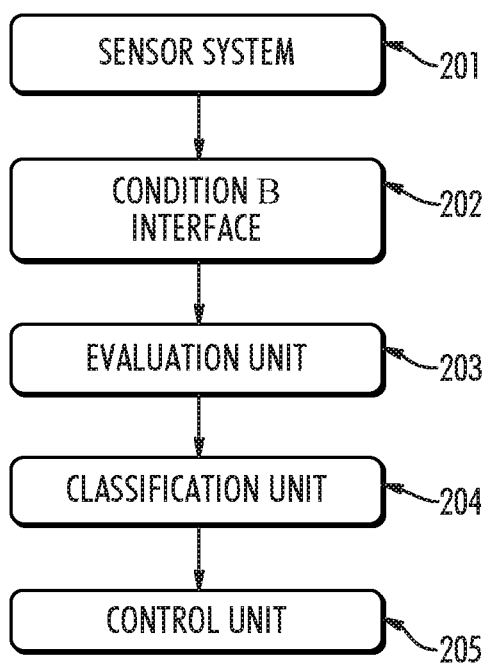
FIG. 2 shows a schematic composition of a device according to the invention.

FIG. 2 shows a device for the open-loop and/or closed-loop control of actuators of a robot, taking environmental contacts into consideration, wherein the robot comprises at least two parts, which are connected by way of an articulated joint drivable by an actuator. The device comprises a sensor system 201 for ascertaining and storing a time-dependent variable G(t) which can be used to describe the action, as a function of the time, of one or more external contact forces $F_{ext}$ and/or of one or more external moments $M_{ext}$ on the parts, an interface 202 for providing a condition B for this variable G(t), an evaluation unit 203, which is configured and designed in such a way that, provided that the condition B is not satisfied by G(t) at a time $t_0$, a feature vector $\vec{M}$(G(t)) is ascertained for the detected variable G(t) over a time interval $T=[t_a, t_e]$, where $t_a$=start of the time interval, $t_e$=end of the time interval, $t_0 \in T$ and $t_0 < t_e$, the feature vector comprising the following components: a median or mean value of G(t) in the time interval T, a minimum and a maximum of G(t) in the time interval T, a deviation of G(t) from the median or from the mean value in the time interval T, a signal width of G(t) in the time interval T, a frequency spectrum of G(t) in the time interval T, and one or more characteristic frequencies of the frequency spectrum, a classification unit 204 for classifying the feature vector $\vec{M}$ (G(t)) based on predefined categories, which each indicate a contact type between the parts and an object in a surrounding environment, which are each imparted by corresponding external contact forces $F_{ext}$ and/or external contact moments $M_{ext}$, to generate a classification result KE, and a unit (205) for the open-loop and/or closed-loop control of the actuator as a function of the classification result KE.

The invention claimed is:

1. A method for the control and regulation of actuators of a robot, taking environmental contacts into consideration, wherein the robot comprises at least two parts, which are connected by way of an articulated joint drivable by an actuator, comprising the following steps:
by way of a sensor system, ascertaining and storing a time-dependent one-dimensional or multidimensional variable G(t) which can be used to describe an action, as a function of time, of one or more external contact forces $F_{ext}$ and/or of one or more external moments $M_{ext}$ on the at least two parts;
providing a condition B for the variable G(t);
provided that the condition B is not satisfied by G(t) at a time to, a feature vector $\vec{M}^{\vec{M}}$ (G(t)) is ascertained for the variable G(t) in a time interval $T=[t_a, t_e]$, where $t_a$=start of the time interval, $t_e$=end of the time interval, $t_0 \in T$ and to $< t_e$, the feature vector $\vec{M}$(G(t)) comprising the following components:
a median or mean value of G(t) in the time interval T;
a minimum and a maximum of G(t) in the time interval T;
a deviation of G(t) from the median or from the mean value in the time interval T;
a signal width of G(t) in the time interval T;
a frequency spectrum of G(t) in the time interval T; and
one or more characteristic frequencies of the frequency spectrum,
classifying the feature vector $\vec{M}^{\vec{M}}$(G(t)) based on predefined categories, which each indicate a contact type between one of the at least two parts or the articulated joint and an object in a surrounding environment, which are each imparted by corresponding external contact forces $F_{ext}$ and/or external contact moments $M_{ext}$, to generate a classification result KE; and
open-loop and/or closed-loop control of the actuator for times $t > t_0$ as a function of the classification result KE.

2. The method according to claim 1, wherein the feature vector $\vec{M}(G(t))^{\vec{M}}$ additionally comprises the following components:
Shannon entropy or Shannon entropy distribution of G(t) in the time interval T; and/or
a Hjorth parameter of G(t) in the time interval T; and/or
one or more energy parameters of G(t) in the time interval T; and/or
one or more autocorrelation parameters of G(t) in the time interval T; and/or
a skewness parameter of G(t) in the time interval T; and/or
one or more spectral phase parameters of G(t) in the time interval T; and/or
one or more spectral amplitude parameters of G(t) in the time interval T.

3. The method according to claim 1, wherein the start $t_a$ of the time interval T and the end $t_e$ of the time interval T are time-dependent: $t_a=t_a=t_a(t)$ and $t_e=t_e(t)$, or the end $t_e$ of the time interval T is time-dependent: $t_e=t_e(t)$.

4. The method according to claim 1, wherein the robot comprises multiple parts, which are connected by way of a plurality of articulated joints drivable by an actuator.

5. The method according to claim 1, wherein the variable G(t) indicates one or more forces and/or one or more torques and/or one or more mechanical stresses and/or one or more pressures.

6. The method according to claim 1, wherein the sensor system comprises at least one sensor, which is arranged on one of the at least two parts and comprises sensor elements arranged in a planar manner for position-sensitive detection of external forces $F_{ext}$ relative to the part, the variable G(t) being ascertained based on the detected external forces $F_{ext}$.

7. The method according to claim 1, wherein the sensor system comprises a torque sensor and/or force sensor and/or acceleration sensor connected to one of the articulated joints for detecting a torque engaging on the articulated joint and/or a force engaging on the articulated joint and/or an acceleration engaging on the articulated joint.

8. The method according to claim 1, wherein the variable G(t) is ascertained in each case for one or more of the at least two parts and/or for one or more articulated joints.

9. The method according to claim 1, wherein, as a function of the generated classification result KE, open-loop and/or closed-loop control of the actuator takes place in such a way that a movement of the parts is stopped, slowed, accelerated, or a movement in the opposite direction is initiated.

10. A device for the control and regulation of actuators of a robot, taking environmental contacts into consideration, wherein the robot comprises at least two parts, which are connected by way of an articulated joint drivable by an actuator, comprising:
a sensor system for ascertaining and storing a time-dependent variable G(t) which can be used to describe an action, as a function of time, of one or more external contact forces $F_{ext}$ and/or of one or more external moments $M_{ext}$ on the at least two parts;
an interface for providing a condition B for the variable G(t);
an evaluation unit, which is designed and configured in such a way that, provided that the condition B is not satisfied by G(t) at a time $t_0$, a feature vector $\vec{M}(G(t))^{\vec{M}}$ is ascertained for the variable G(t) in a time interval $T=[t_a, t_e]$, where $t_a$=start of the time interval, $t_e$=end of the time interval, $t_0 \in T$ and $t_0 < t_e$, the feature vector $\vec{M}(G(t))$ comprising the following components:
- a median or mean value of G(t) in the time interval T;
- a minimum and a maximum of G(t) in the time interval T;
- a deviation of G(t) from the median or from the mean value in the time interval T;
- a signal width of G(t) in the time interval T;
- a frequency spectrum of G(t) in the time interval T; and one or more characteristic frequencies of the frequency spectrum, a classification unit for classifying the feature vector $\vec{M}(G(t))^{\vec{M}}$ based on predefined categories, which each indicate a contact type between the at least two parts and an object in a surrounding environment, which are each imparted by corresponding external contact forces $F_{ext}$ and/or external contact moments $M_{ext}$, to generate a classification result KE; and a unit for open-loop and/or closed-loop control of the actuator as a function of the classification result KE.

11. The device according to claim 10, wherein the feature vector $\vec{M}(G(t))^{\vec{M}}$ ascertained by the evaluation unit additionally comprises the following components:
- Shannon entropy or Shannon entropy distribution of G(t) in the time interval T; and/or
- a Hjorth parameter of G(t) in the time interval T; and/or
- one or more energy parameters of G(t) in the time interval T; and/or
- one or more autocorrelation parameters of G(t) in the time interval T; and/or
- a skewness parameter of G(t) in the time interval T; and/or
- one or more spectral phase parameters of G(t) in the time interval T; and/or
- one or more spectral amplitude parameters of G(t) in the time interval T.

12. The device according to claim 10, wherein the start, $t_a$, of the time interval T and the end, $t_e$, of the time interval T are time-dependent: $t_a = t_a(t)$ and $t_e = t_e(t)$, or the end $t_e$ of the time interval T is time-dependent: $t_e = t_e(t)$.

13. The device according to claim 10, wherein the robot comprises multiple parts which are connected by way of a plurality of articulated joints drivable by an actuator.

14. The device according to claim 10, wherein the variable G(t) indicates one or more forces and/or one or more torques and/or one or more mechanical stresses and/or one or more pressures.

15. The device according to claim 10, wherein the sensor system comprises at least one sensor, which is arranged on one of the at least two parts and comprises sensor elements arranged in a planar manner for position-sensitive detection of external forces $F_{ext}$ relative to the part, the variable G(t) being ascertained based on the detected external forces $F_{ext}$.

16. The device according to claim 10, wherein the sensor system comprises a torque sensor and/or force sensor and/or acceleration sensor connected to one of the articulated joints for detecting a torque engaging on the articulated joint and/or a force engaging on the articulated joint and/or an acceleration engaging on the articulated joint.

17. The device according to claim 10, wherein the variable G(t) is ascertained in each case for one or more of the parts and/or for one or more articulated joints.

18. The device according to claim 10, wherein, as a function of the ascertained classification result KE, open-loop and/or closed-loop control of the actuator takes place in such a way that a movement of the parts is stopped, slowed, accelerated, or a movement in the opposite direction is initiated.

* * * * *